Dec. 11, 1962 M. BIALY ET AL 3,067,442
LAST BLOCKS AND SHOE LASTS MANUFACTURED THEREFROM
Filed June 27, 1960

INVENTORS
MICHAEL BIALY
KARL F. KLEBSCH

United States Patent Office 3,067,442
Patented Dec. 11, 1962

3,067,442
LAST BLOCKS AND SHOE LASTS MANUFACTURED THEREFROM
Michael Bialy, Brooklyn, and Karl Friedrich Klebsch, Elmhurst, N.Y., assignors to Leslynn Products Corp., Long Island City, N.Y., a corporation of New York
Filed June 27, 1960, Ser. No. 39,105
1 Claim. (Cl. 12—133)

This invention relates to a new and improved method for the preparation of last blocks and to novel shoe lasts manufactured therefrom. More particularly, the invention pertains to the manufacture of crude shoe last blocks and the finished shoe last from thermoplastic material such as polyethylene.

Shoe lasts are defined as the form, shaped like a foot, around which shoes are shaped during their manufacture. It has been customary to make shoe lasts by reducing crude, wooden last blocks to the desired size and final configuration through the use of various profiling equipment. Rock maple is the wood generally used for these purposes, and its continual use is indicative that no better material has been available heretofore. Nevertheless, it is well recognized that the use of rock maple wood has many disadvantages. For one thing, this type of wood is in scarce supply, and, consequently, quite expensive. Due to the necessity of first forming a crude last block and then preforming the precise shoe last therefrom considerable wood waste is obtained, and since this material cannot be recovered and reused in the manufacturing operation it is difficult to offset the high cost of the starting material. The wooden shoe lasts are also subject to severe damage such as cracking upon impact because of the lack of complete uniformity of even the best maple wood. In addition, wooden shoe lasts are subject to warping and other dimensional changes resulting from constant variations in the moisture content of the wood. These undesirable changes in the wooden shoe lasts seriously affect their necessary reproducibility characteristics.

In view of the numerous disadvantages attendant upon the use of wood in the manufacture of shoe lasts, there have been many proposals in recent years to utilize other material. The use of thermoplastic materials has been included in these proposals. It has been suggested that with the use of thermoplastic material the direct molding of the shoe last would be possible thereby avoiding the time and apparatus required to profile the crude last block. It was found, however, that such an operation was commercially unfeasible because it required the use of an expensive mold for each particular shoe last. It was further found that most thermoplastic materials heretofore used were seriously lacking in impact strength and other properties required in order to obtain a shoe last capable of commercial use. Moreover, it was found that the large solid blocks of the thermoplastic material, e.g., polyethylene, were structurally deficient because of the formation of internal voids or hollows during rapid cooling and solidification. The formation of these internal voids could be avoided by the use of special equipment which exerted pressure on the mass of thermoplastic material undergoing cooling and solidification. It is obvious, however, that the use of such special equipment would substantially increase the cost of the shoe last product.

One object of this invention is to provide a method for preparing last blocks from a thermoplastic material rather than from wood. Another object of this invention is to provide a method for utilizing thermoplastic material in the manufacture of last blocks which avoids the difficulties encountered in the prior art methods of manufacturing large blocks of thermoplastic material. A further object of this invention is to provide a method which leads to the production of crude thermoplastic last blocks having a high impact strength, substantially free of voids and hollows, excellent workability and machinability properties, and other essential characteristics necessary for their conversion to shoe lasts and use as such. A still further object of this invention is to provide a novel shoe last prepared from a thermoplastic material such as polyethylene which is superior in many respects to the conventional shoe last made from maple wood, and in addition, eliminates many of the disadvantages accompanying the manufacture of the shoe last from wood. Other objects of the invention will become apparent from the ensuing description.

These and other objects of the invention are attained by utilizing high density polyethylene and a special solidification procedure during the molding operation for the formation of the crude last blocks. In accordance with the invention, it has been found to be essential to employ as starting material a linear polyethylene having a density of at least about 0.945, and preferably a density within the range of about 0.945 to 0.955. The polyethylene should also have a melt index of about 0.2 to 1.0 gram/10 minutes, preferably about 0.3 to 0.5 gram/10 minutes. It was found that by employing the high density polyethylene feed and the special cooling method of this invention the polyethylene shoe last product had the following desirable properties:

(a) Nailability, i.e. the ease with which nails can be repeatedly driven into the last in order to attach and form the upper parts of the shoe before the sole and heel are connected, was excellent. Wooden lasts have the disadvantage of cracking or being deformed when subjected to repeated nailing. Also, thermoplastics with hardness values above 70 on the "D" scale of the Shore Durometer do not lend themselves to be used as shoe last material, since the nails are subject to breaking during nailing.

(b) High impact strength was combined with flexibility, which is highly desirable since the lasts are subjected to continuous impact and flexing in various presses during the manufacture of shoes.

(c) Low moisture absorption, which avoids problems encountered as a result of the exposure of the last to steam during shoe manufacturing operations.

(d) Low coefficient of friction with fabrics and leather which facilitates easy removal of the last from the shoe when the latter has been formed.

It will be understood that the exact method used in preparing the polyethylene resin is not an essential feature of the instant invention. Thus, the various metallic, organometallic, and non-metallic catalysts known to the art can be used to polymerize the ethylene under established operating conditions. In practicing this invention, however, a high density polyethylene resin, i.e. about 0.945 to 0.960 and particularly at least about 0.945 or higher is utilized. Commercially available polyethylene resins marketed under such trademarks as Marlex, Super Dyland, Catalin, Fortiflex, Grex, Hi-Fax, Bakelite, Alathon, and the like may be effectively employed in the method of this invention. By the term polyethylene it is also intended to cover copolymers of ethylene and other unsaturated compounds such as propylene, butene, isobutylene, etc. as well as blends of polyethylene with other polymers provided that the density of the material is within the above range. Conventional additives such as antioxidants, slip agents, wetting agents, pigments, and the like may be incorporated in the resins. According to one method for manufacturing high density polyethylene, ethylene is dissolved in a solvent at moderate pressures, usually 500 to 1000 p.s.i., and the solution is placed in contact with one of a number of widely different catalysts which are insoluble in the solvent. Active centers on the surface of the catalyst polymerizes the ethylene by means of a co-ordinating or directing mechanism which, in most cases results in a "straight chain" or substantially unbranched polyethylene molecule. The absence of branches permits the molecules to pack together more closely and results in a denser material.

In general, the molding and solidification procedures employed in this invention comprise the addition of molten polyethylene to a molding zone or mold, maintaining the polyethylene in its amorphous state at a temperature just above, e.g. about 5 to 10 degrees, its crystallization point for a period of time sufficient to reduce the temperature gradient between inner and outer portions of the polyethylene mass to a minimum, and then further cooling to obtain simultaneous crystallization throughout the polyethylene mass and formation of the polyethylene last block. If the molten polyethylene was added to a mold and then, according to conventional methods permitted to cool directly to room temperature, undesirable voids and hollows would form throughout the solidified polyethylene. This formation would occur because of the shrinkage resulting when the outer surface of the polyethylene mass solidifies first and the molten inner portion of the polyethylene solidifies later. In accordance with the method of this invention, uniform and substantially simultaneous solidification of the entire polyethylene mass occurs by reducing the temperature gradient between the inner and outer portions of the polyethylene mass to a minimum while the polyethylene is still in an amorphous state. More specifically, the cooling of the polyethylene is deliberately slowed down to obtain the lowest possible temperature gradient between the inner and outer portions of the polyethylene mass when it reaches its crystallization temperature, since about half of the volume decrease upon cooling takes place during crystallization. The resulting solidified polyethylene block is void-free and can be readily employed in the manufacture of polyethylene shoe lasts having outstanding properties. It is obvious from the above description that expensive and special equipment need not be employed in the method of this invention. Moreover, the above method obviates the need to subject the thermoplastic material to pressure throughout the solidification step.

As previously noted, the method of this invention may be carried out in conventional equipment. In accordance with the preferred method of operation, an extrusion-molding machine is employed and, for the purposes of providing a more detailed description of the invention, will be referred to hereinafter with an illustrative run. The machine is a combination of a typical extruder and a revolving drum or table upon which a series of spaced apart molds are mounted. The machine may be so constructed that both the extruder and the revolving drum are controlled automatically from one single control cabinet which is equipped with timing and temperature relays. The operation is commenced by heating the extruder to the proper temperature, i.e. about 270° to 280° C., and then feeding the polyethylene, via a funnel-shaped hopper or comparable feeding device, into the channels of the screw rotating within the extruder barrel. The polyethylene feed may be in the form of cubes, powder or in any other form which would not interfere with the operation of the extruder. As the polyethylene is forced forward by the rotating screw flights, it is heated, melted, mixed, and compressed to obtain a homogeneous melt. When the molten polyethylene is about to emerge from the nozzle located at the terminal end of the extruder barrel, a mold on the revolving drum is brought into engagement with the nozzle and the polyethylene melt is injected into the mold. After the mold has been completely filled with the polyethylene, usually after an established and preset period of time, a clutch controlling the motion of the screw is disengaged and the extrusion of polyethylene is stopped. At this point the mold is also disengaged from the nozzle, and the drum is revolved to bring an empty mold into engagement with the nozzle. The extruder is then placed in operation again and the new mold is filled with molten polyethylene. By this method of operation the extrusion is essentially continuous with only momentary pauses to permit disengagement of the filled mold and its replacement with a fresh mold. The revolving drum or table may contain as many as twenty-four molds of varying sizes and shapes. For the present purposes, however, the revolving drum will have an arrangement of about 6 to 10 molds, and the molds will ordinarily be approximately the same size.

The first mold which has been filled with the polyethylene and which has now been moved to a disengaged position on the revolving drum is opened by a hydraulic opening device located 180 degrees from the nozzle and the molten shaped block is dumped into a portable container. This container is shaped generally in the form of the crude last block or rough shoe last form and corresponds to the shaped block coming out from the molding machine. Although its dimensions may vary over a wide range, it is preferred to construct it in such a manner that there is a minimum of waste polyethylene during the profiling operation. It will be understood, however, that the exact shape of mold cavity and of the portable container are not critical, since one of the obvious advantages of the present method is the ability to re-extrude the polyethylene shavings recovered in the profiling step. For purposes of illustration, the portable container may be about 3 to 5 inches wide, about 13 to 16 inches long, and about 6 to 8 inches high. A substantial portion of the bottom of the mold may be tapered to correspond to the upper heel portion of the shoe last and to minimize the degree of profiling required in that area. The portable container may be made of such material as cast aluminum, sheet aluminum, sheet metal, cast iron, plywood, and the like. The step of emptying the portable containers can obviously take place while succeeding ones are being filled with the molten polyethylene blocks coming out from the molding machine.

The mass of polyethylene placed in the portable container is at a temperature higher than its crystallization temperature with the exception of the very outer layer which cooled upon contact with the mold on the rotating table. When, in accordance with an essential feature of this invention, the portable container filled with polyethylene is next placed in an insulated enclosure the outer solidified layer of skin is remelted. This is due to the fact that the inside of the block is at a much higher temperature and the amount of heat passing to the surface is great enough to raise the temperature of skin layer above the melting point of the polyethylene. There is only a gradual heat loss, mainly by convection, from the insulated enclosure. The mass of polyethylene then begins to cool and to achieve a uniform temperature as it remains in the insulated enclosure. After the uniform temperature throughout the polyethylene mass has been lowered to a point just above its crystallization temperature, the polyethylene is cooled below its crystallization temperature to effect complete solidification. The crude polyethylene last block is removed from the portable container, after the latter has been withdrawn from the insulated enclosure, and passed to the profiling operation. The emptied container may then be returned to the production line.

The amount of time the portable container or second molding zone filled with the polyethylene is kept in the insulated enclosure may, of course, vary over a wide range depending upon such factors as the design of the insulated enclosure and its temperature controls, the mass of the block, proportion of its dimensions, and initial temperature. A time period of at least about 6 hours, and preferably, about 6 to 10 hours, has been found to be effective in actual practice of this invention, although longer or shorter periods may be employed. It will also be understood that the enclosure may vary in design depending upon the number of containers to be accommodated at one time and the method used for introducing and removing the containers. In general, it is advisable to provide an insulated enclosure with perforated shelves and a heated air blower having a thermostatic control to insure the maintenance of a uniform temperature in the polyethylene mass slightly above its crystallization temperature. Utilizing the high density polyethylene resins referred to above, the crystallization temperatures may vary from about 115° to 135° C. For example, utilizing Marlex 5003 polyethylene resin the crystallization temperature will be about 126° C.

Obviously numerous variations in the design of the insulated enclosure described above may be employed in carrying out the method of this invention. One possible design would comprise an insulated tunnel provided with a moving conveyor upon which the portable containers filled with the polyethylene mass are placed. The length of the tunnel would be calculated with relation to the number of containers passing through it to allow for sufficient residence times. Another possible design would be an oven provided with heating and cooling means. It will be understood, therefore, that many variations and modifications may be made in the structure of the insulated enclosure or zone without departing from the broader aspects of this invention.

It is important to again note that one of the most important features of the present invention is to effect reduction of the temperature gradient between the inner and outer portions of the polyethylene mass to a minimum before cooling to solidification temperatures. This is principally accomplished by controlling the rate of cooling and by not permitting the temperature of any part of the polyethylene block quickly or suddenly to drop lower than that of crystallization. By utilizing the insulated enclosure, the polyethylene mass is cooled slowly and uniformly. Under these conditions any shrinkage which occurs will also be uniform throughout the polyethylene mass whereby avoiding the formation of shrinkage cavities or hollows. In its essence, the particular cooling step developed herein calls for maintaining the polyethylene mass at a temperature above its crystallization temperature for a sufficient peroid of time to minimize the temperature gradient between the inner and outer portions of the polyethylene block while slowly cooling the polyethylene mass to its crystallization temperature.

The invention will be more fully understood by reference to the following illustrative example.

*Example*

Pellets of high density polyethylene, Marlex 5000 type 3, were placed in a conical blender together with minor amounts of "Santanox" antioxidant, and "Slip-eze" slip agent. The resulting batch was mixed for 20 minutes to achieve a good dispersion of the resin and the additives. In the meantime, the extruder is heated up to about 540° F., and water at a temperature of about 180° F. is circulated through the molds on the automatically revolving drums. When the mixing cycle is completed, the feed material is placed in the hopper of the extruder and the screw is started. The first mold is filled in approximately 35 to 40 seconds and, after the pressure inside the mold reached about 4000 to 4500 p.s.i., the screw is stopped. After about 3 to 5 seconds, which allows the sprue to solidify, the mold is disengaged from the nozzle. The table revolves to bring in another mold, and the filling cycle is repeated. The mold filled with the polyethylene is opened by a hydraulic device located 180 degrees from the nozzle. The molded block of polyethylene is placed in a portable aluminum container of corresponding shape, which is then placed in an insulated enclosure preheated initially to about 275° F. and left for curing and slow cooling for about 6 to 8 hours. After the block solidified in the insulated enclosure, the container is withdrawn and the crude last block is removed. The container is returned to the molding operation. When the crude last block has cooled to room temperature, it is subjected to profiling in a duplicating lathe. The finished shoe last is free of internal voids, has a high impact strength, low moisture absorption, and the other desirable properties discussed above.

The above results confirm that by practicing the method of this invention it is possible to obtain a last block or crude last form which is free of voids. It was also demonstrated that the last block has sufficient impact strength to withstand the rigors of the profiling treatment and subsequent use as a shoe last. In contrast, comparable runs carried out under the same conditions with the exception that the cooling was accomplished by plunging the container holding the polyethylene mass into a cooling medium such as water or by storage at room temperature produced a solidified polyethylene block characterized by having numerous internal voids or hollows and by being impossible to subject consistently to a successful profiling treatment. Finished shoe lasts prepared from such polyethylene blocks were completely unsatisfactory.

Another aspect of this invention pertains to the production of left and right shoe lasts from the last blocks prepared as described above. The last block is reduced to the desired size and final configuration by the use of conventional profiling equipment such as that manufactured by the Incoma, Seidl, and Fargus companies. It will be understood, however, that the use of any particular one of the aforementioned profiling setups is not an essential feature of this invention. It will be further understood that male and female shoe lasts, of all sizes and shapes, may be produced from the above last blocks formed of high density polyethylene. All polyethylene scrap recovered in the profiling operation will be recycled to the extruder.

The accompanying drawings illustrate a crude last block and a finished show last prepared from high density polyethylene in accordance with the method of this invention, in which.

Figure 1:
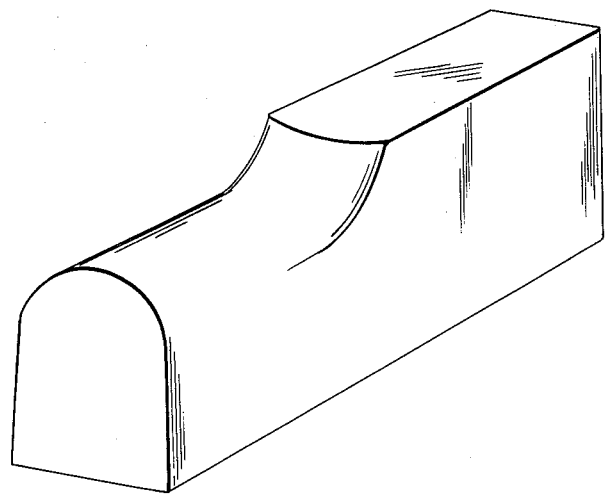
FIG. 1 is an angular view of the crude last block.
Figure 2:
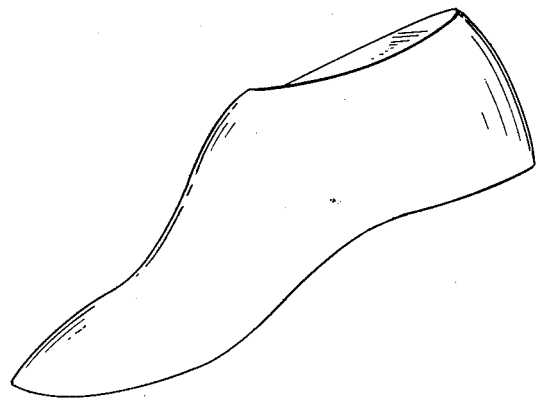
FIG. 2 is an angular view of the finished shoe last.

Shoe lasts prepared from the crude last blocks obtained by the method of this invention were tested to determine the presence of internal voids and other characteristics as compared to shoe lasts made from maple wood. When a number of the polyethylene shoe lasts of this invention were cut up in slices averaging about ⅛ of an inch in thickness, no porosity or internal voids were found. In testing for comparative impact strength, steel balls of increasing weight were dropped from a measured height on polyethylene and maple wood lasts. It was found that the polyethylene last could withstand appreciably greater impacts before fracture took place. The wooden lasts also showed a tendency to chip at various points when tumbled in a barrel for a period of one hour, whereas the polyethylene lasts remained unchanged. It was further found that the polyethylene lasts in flexibility tests will retain their structural characteristics well beyond the limits of the wood last. Various nailability tests indicated that the polyethylene last was far superior to maple lasts in retentiveness, etc. upon continual use of the lasts. In further demonstration of the outstanding properties of the polyethylene lasts of this invention, a large number of these lasts have been employed experimentally for several months in shoe factories with excellent ratings as to durability and other properties essential for successful commercial utilization.

It is also contemplated that the molds and the portable containers may be so designed that only a relatively small amount of the polyethylene has to be removed during profiling. This would obviously speed up the entire manufacturing operation for the production of the finished shoe last. Another important advantage of the present invention results because the high density polyethylene shoe last is so smooth that few, if any, finishing operations are required. It will be further understood that the method of this invention may be effectively employed to prepare polyethylene and other thermoplastic material blocks of varying sizes and shapes.

The term "last" as used throughout this specification and appended claim is intended to include last blanks and any similar forms or patterns employed in the shoe-making art.

What is claimed is:

A shoe last comprising a hard, void-free, non-absorbent body adapted to repeatedly receive nails in the making of shoes, said body consisting essentially of substantially linear polyethylene having a density within the range of about 0.945 to 0.960.

References Cited in the file of this patent
UNITED STATES PATENTS

| | | |
|---|---|---|
| 1,575,527 | Boehmer | Mar. 2, 1926 |
| 2,309,729 | Gordon | Feb. 2, 1943 |
| 2,521,072 | Lovell | Sept. 5, 1950 |
| 2,617,129 | Petze | Nov. 11, 1952 |
| 2,738,551 | Howald | Mar. 20, 1956 |